March 19, 1935.   W. C. LICHTY   1,994,719
DIFFERENTIAL DUAL WHEEL
Filed June 12, 1931   2 Sheets-Sheet 1
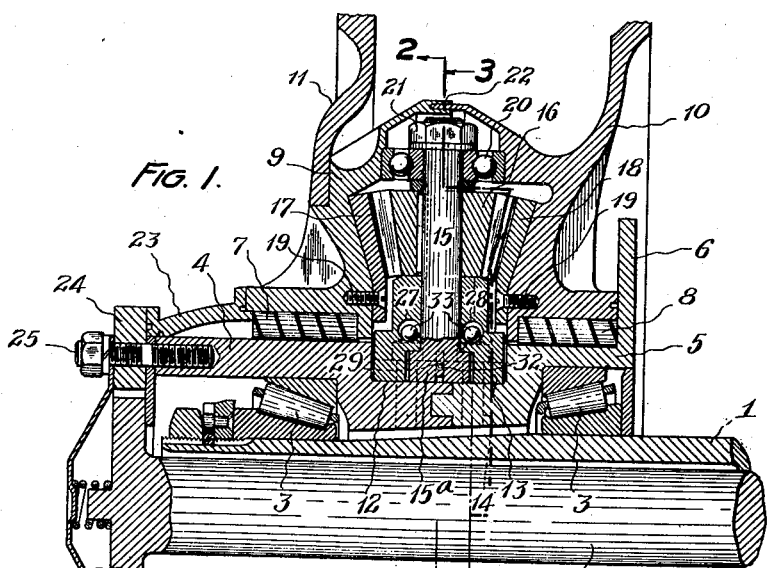
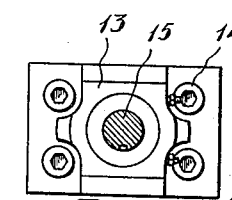
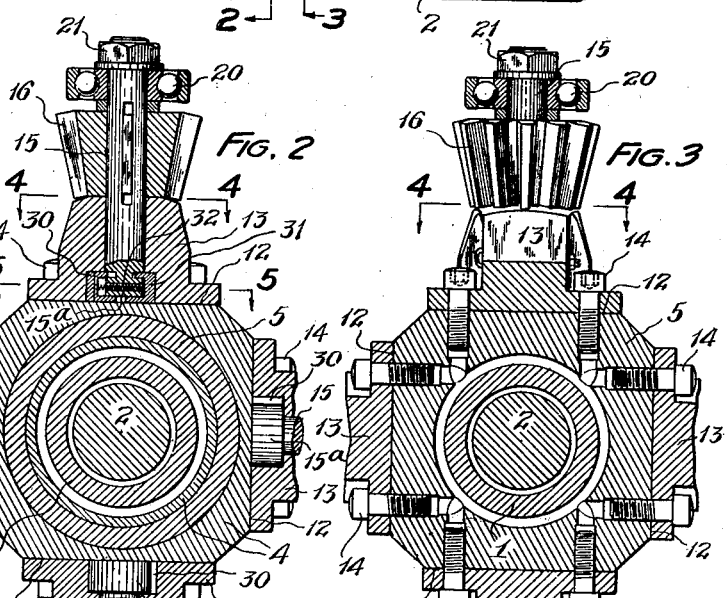
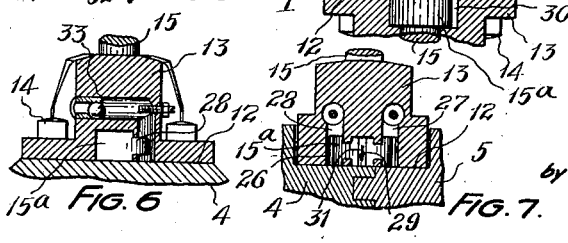
INVENTOR:
WARREN C. LICHTY.
by his atty.

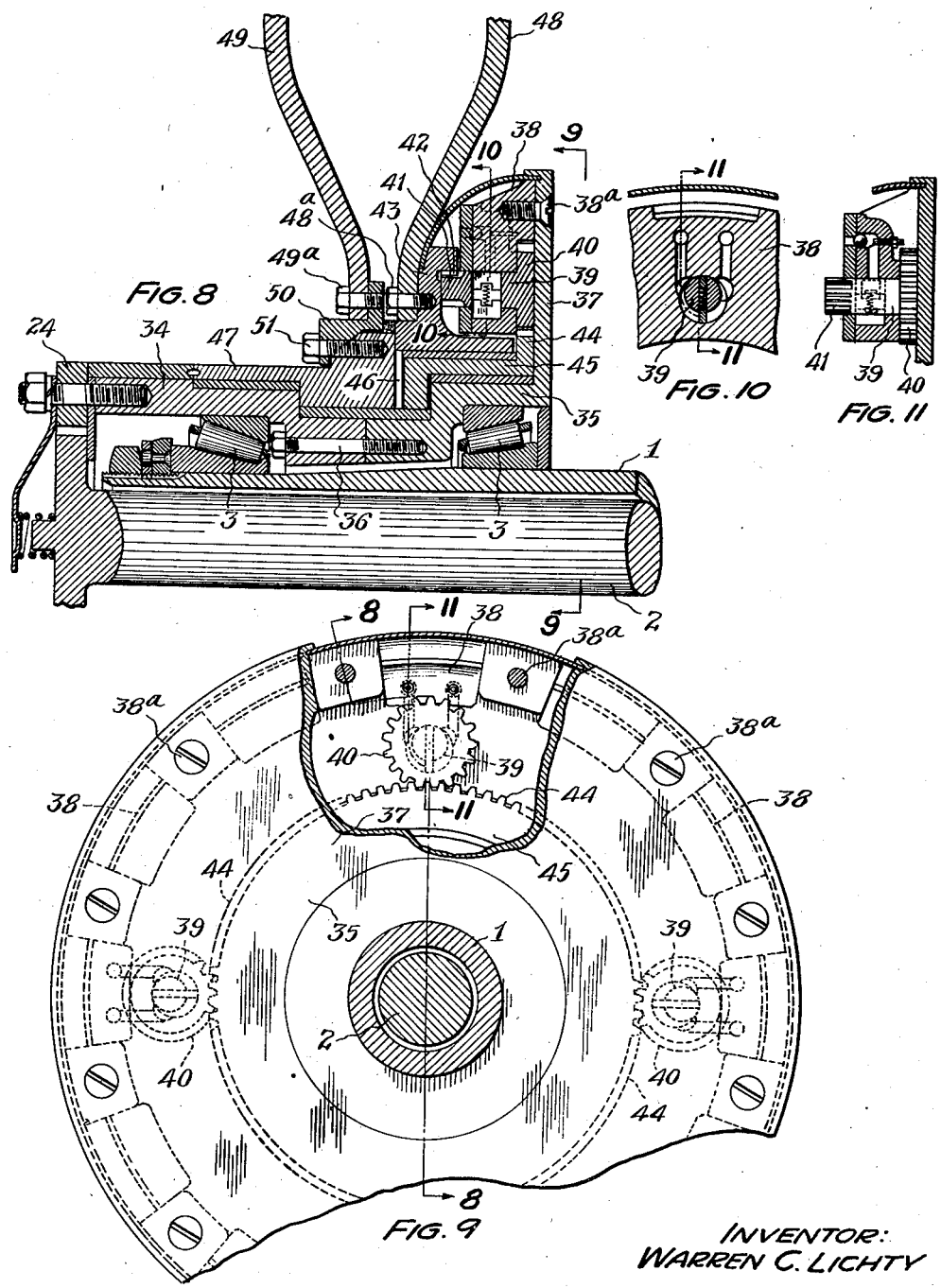

Patented Mar. 19, 1935

1,994,719

UNITED STATES PATENT OFFICE 1,994,719

DIFFERENTIAL DUAL WHEEL

Warren C. Lichty, Wayne, Mich.

Application June 12, 1931, Serial No. 543,814

12 Claims. (Cl. 180—22)

My invention pertains to a differential dual wheel and more particularly to a dual wheel construction including a differential connection (expectably with gearing) between the two adjacent wheels, together with a pump or pumps adapted to be automatically operative to control the functioning of said differential connection whenever the dual wheel is rolling in its own circular plane.

I am aware that differential gearing has long been used in the automotive art, in rear axle and brake rocking-rod constructions, and also know that pumps have been employed to act as a check when the normal action of the differential in a rear axle assembly is disadvantageous (see Moon Patent No. 1,178,093 of April 4, 1916 and Föttinger No. 1,646,020 of October 18, 1927). Evidently, hydraulic means have been employed for locking the differential mechanism between two wheels spaced at opposite ends of an axle, but I believe it is novel to employ differential gearing between closely adjacent wheels of a dual wheel unit and therefore also novel to employ automatically operating hydraulic means for occasionally checking or preventing the functionating of such a differential connection.

My invention is designed for use in dual wheels wherever employed including use on front wheels of a four-wheel-drive truck and on the steering spindles of both truck and trailer where the present type of dual wheel is impractical or not feasible. My differential mechanism may be of the standard type or be somewhat modified by use of an additional gear in the train, and my drawings illustrate both forms. I recommend employment of a vane pump of a type in successful use in refrigerators as more readily adapted to a dual wheel construction than either a gear pump or a piston pump as locking devices. My pump is so mounted that when the circumferentially arranged idler gears of the differential connection are rotated in consequence of a difference in action between a pair of wheels of the dual unit, it will automatically operate, subject to a check valve, so as to force oil and create a pressure sufficient to stall or partially to stall the pump shaft and idler gear or gears to thereby compel the two wheels to rotate in unison.

Other advantages to be realized by use of my invention are, (1) if a pair of my differentialized dual wheels are used on the driven axle of a truck, the differential commonly used may be eliminated, (2) if my invention is adapted to the steerable axle of a truck, bus or trackless trolley, which have been carrying nearly the same load on two front wheels as on four rear wheels, the brakes may be successfully applied to both tires of the wheel without relative slippage therebetween and such vehicles could carry greater loads by using differentialized wheels on the front axle to increase their safety in case of an individual tire collapse.

Adverting to the drawings:

Figure 1 is an axial sectional view of a dual wheel embodying my invention.

Figure 2 is a section on line 2—2 of Figure 1.

Figure 3 is a section on zig-zag line 3—3 of Figure 1.

Figure 4 is a section on line 4—4 of Figures 2 and 3.

Figure 5 is a section on line 5—5 of Figure 2.

Figure 6 is a section on line 6—6 of Figure 5.

Figure 7 is a section on line 7—7 of Figure 5.

Figure 8 is a view corresponding to Figure 1 of a modified form of my invention.

Figure 9 is a broken view on line 9—9 of Figure 8 with certain concealed portions indicated in dotted lines.

Figure 10 is a section on line 10—10 of Figure 8.

Figure 11 is a section on line 11—11 of Figure 10.

A standard roller bearing axle construction includes a hollow axle 1 through which extends a floating drive shaft 2 and feasibly mounted around the axle 1 are sets of roller bearings 3. In turn surrounding the roller bearing units 3 is a main hub composed of an outer part 4 and an inner part 5, the latter being provided at its inner end with an annular brake flange 6. The outer hub section 4 is to be driven whereas the inner hub section 5 is to assume the brake torque.

Around the composite hub are, in spaced relation, outer and inner wheel bearings 7 and 8 respectively on which are mounted outer and inner wheel discs 9 and 10. The inner wheel disc 10 extends radially outward to a point where there is to be secured thereto, in the usual manner by means of a bolt clamp, a rim to project inwardly therefrom. Since nothing is claimed for the rim attachment, it is unnecessary to disclose it in the drawings. The outer wheel disc 9 may be a composite structure to include a disc 11 to be bolted or otherwise detachably secured to its complementary disc 9.

At the junction of the hubs 4 and 5 they are squared at 12 in a radially outward presentation for the support at the four circumferentially arranged locations of four hollow pinion shaft bearings 13, the radially inward ends of the bores therein being enlarged for the reception each of a vane pump to be later described. The shaft bearings and pump housings 13 are secured by the cap screws 14, as clearly appears in Figure 3. Mounted in each of the bearings 13 is a pinion shaft 15 to which is keyed an idler pinion 16 which is in mesh on its opposite sides with a pair of ring gears 17 and 18 to be integrally machined or appropriately secured by screws 19 to the opposed sides of the wheel discs 9 and 10. The outer extremity of each of the four pinion shafts 15 carries mounted between the discs 9 and 10 a thrust bearing 20, which is adapted to relieve its pinion gear of side thrust. Each bearing 20 is held in place by a nut 21 and the nuts are enclosed by a tongue and groove closure at 22.

As will be readily understood, the connections between the pinions 16 and the ring gears 17 and 18 constitute differential mechanism whereby the discs 9 and 10 may revolve at the same speed while the pinions do not rotate, or the discs 9 and 10 may revolve with a differential ratio to cause the pinions 16, and hence their shafts 15, to rotate in unison in either direction depending upon a curved path of travel, or better traction at one tire tread than at the other.

A wheel retainer and oil lock 23 is held in place by a wheel hub driving ring 24 secured by studs 25. The driving train may therefore be traced from the shaft 2 to the hub driving ring, thence to the composite hub, shafts 15, pinions 16, ring gears 17 and 18 and discs 9 and 10.

Since the pump structure at the inner end of each of the four pinion shafts 15 is identical, the singular number will be employed while furnishing the brief description of the pump structure, as shown in Figures 5-7 inclusive. A very brief description should be adequate because such vane pumps are old and because nothing is claimed for any pump structural detail, nor for the use of such a pump apart from its cooperative combination with a differential dual wheel. Observation of the location of the vane pump, as shown in Figure 2, where the section line of Figure 5 is taken, as well as notice of Figure 5 will show the shaft 15 to be eccentrically disposed with reference to the pump housing whereby a crescent shaped passage 26 may afford communication around the shaft 15 between the two pump openings 27 and 28. The radially innermost end of the shaft 15 projects into the pump housing to be there appositioned to the passage 26 and such end of the shaft 15, which has been supplied with the reference numeral 15a, is diametrically apertured at 29 for the reception, in opposite ends thereof, of vanes 30 and 31 which are reactingly held apart by an interposed spring 32. Each shaft 15 will thereby additionally function as a pump shaft. A ball valve 33, which is adapted to close under pressure, is provided for each of the pump openings 27 and 28. During any rotation of the shaft 15 at an appreciable speed, as when one wheel disc of the dual wheel is turning faster than its companion disc, the pump will operate, through the agency of the vanes 30 and 31, so as to force oil, available from the gear case, against one or the other of the ball checks to hold it seated either in the opening 27 or in the opening 28 thereby creating a pressure sufficient to retard rotation of the pump shaft and consequently rotation of the pinion 16 whereby to resist excessive differential action between the discs 9 and 10.

Directing attention next to sheet 2 of the drawings, which pertains to a modification which I have regarded as an adaptation for demountable wheels as distinguished from the structure illustrated on sheet 1, which I have deemed more suitable for demountable rims. In a similar axle 1 is a floating shaft 2 and the same roller bearings 3 and driving ring 24 may be employed. The axle hub is again composed of two parts 34 and 35 secured by bolts 36, the inner hub part 35 carries a somewhat larger brake torque plate 37, to which is secured a ring 38, as by means of cap screws 38a. The ring 38 is suitably hollowed for the reception of a plurality of vane pumps—four being employed in the exemplification. Mounted to turn in the ring 38 are four shafts 39 on opposite projecting ends of each of which are gears 40 and pinions 41 respectively, as clearly shown in Figures 8 and 11. The four pinions 41 on the outward ends of the shafts 39 mesh with a ring gear 42 formed on the inner side of the inner wheel hub 43, whereas the four gears 40 on the inner ends of the shafts 39 are in mesh with another ring gear 44, which is fashioned on the inner end of an inner part 45 of a duplex outer wheel hub. The inner part 45 is splined at 46 to its complementary hub part 47. Incidentally, the inner part 45 of the outer wheel hub supports a sleeve bearing for the inner wheel disc hub 43. Bearing sleeves, unnecessary to be designated by number, are also shown elsewhere, as, for instance, between the joined ends of the axle hub and of the outer wheel hub. The inner wheel hub 43 carries a disc 48 circumferentially bolted thereto at 48a. In order to afford access to the inner wheel disc 48, the outer disc 49 is secured, by means of bolts 49a, to a removable ring 50 which is likewise detachably secured by circumferentially arranged bolts 51.

The vane pump construction need not be again described in detail, mention being merely made that Figure 10 discloses the eccentric positioning of the shaft 39 in the pump housing, that such shaft is bisected by the spring controlled vanes for forcing oil around the shaft from one pump opening to another unless checked by the functioning of the ball valve, which appears to view in Figure 11.

I claim:

1. A dual wheel comprising the combination of a differential gear set including a revoluble pinion, a wheel couple, gears rotatable with said wheels of the couple respectively and in mesh with opposite sides of one unit of said gear set and a fluid pressure appliance comprising a shaft rotatable with said pinion and a pair of valves one of which is adapted to be closed during the functionating of said appliance whereby to check rotation of said pinion.

2. In a dual wheel, the combination of a hub, a pinion shaft revolubly mounted thereon, an idler pinion mounted on said shaft and a pair of wheels mounted on said hub on opposite sides of said pinion and each carrying a ring gear in mesh with said pinion and a fluid pressure appliance at one end of said shaft and comprising; an arcuate passage about said shaft, a pump driven by said pinion shaft and a pair of valves at opposite ends of said passage, one of said valves being adapted to close under sufficient pressure exerted by said pump whereupon said appliance resists differential action between said ring gears and pinion.

3. In a differential dual wheel, the combination of a hub, a pump shaft rotatably mounted on said hub, an idler pinion keyed to said shaft, a pair of wheels mounted on said hub on opposite sides of said shaft and each carrying a gear in mesh with opposite sides of said pinion and hydraulic means including a valve responsive to the turning movement of said shaft and adapted to close to control fluid circulation and thereby to resist rotation of said shaft and hence of said pinion whereby to resist excessive differential action and tend to cause the paired wheel units then to rotate in unison.

4. In a differential dual wheel, the combination of a hub, a plurality of radially extending shafts rotatably and revolubly mounted on said hub in the same axially transverse plane, an idler pinion carried by each of said shafts, a pair of wheels mounted on said hub on opposite sides of the radial plane of the wheel in which said shafts lie and each carrying a gear in mesh with corresponding sides of said pinions and hydraulic means comprising pump chambers at the radially inner ends of said shafts, said chambers each having a valve controlled inlet and a valve controlled outlet, said outlets, depending upon the direction of rotation of said shafts, being adapted to become closed whereby to resist excessive differential action and to cause the paired wheel units to tend to rotate in unison.

5. In a differential dual wheel, the combination of a hub, a shaft revolubly and rotatably mounted thereon, an idler pinion fixed to said shaft, paired wheel units mounted on said hub on opposite sides of said shaft and each carrying a gear in mesh with opposite sides of said pinion, said hub being fashioned with a fluid conduit partially enveloping said shaft, pressure-operated valves at opposite ends of said conduit respectively, and an hydraulic pump responsive to the rotation of said shaft and adapted at excessive speed of rotation thereof to close that one of said valves at the discharge end of said conduit depending upon the direction of rotation whereby to restrain excessive differential action and to tend to cause the paired wheel units to rotate together.

6. In a differential dual wheel, the combination of a composite hub composed of an outer and an inner part arranged end to end along their axis, a pair of wheels mounted on said hub parts respectively and forming in conjunction with each other a space therebetween, a differential gear set located in said space and operatively connecting said wheels and an hydraulic mechanism functionating in response to exercise of the differential action, said mechanism including a discharge port and valve adapted for complete pressure closure of said port.

7. In a dual wheel, the combination of a hub, circumferentially arranged axially parallel shafts revolubly mounted thereon, a pair of idler gears fixedly mounted on said shafts, a pair of wheels mounted on said hub and each carrying a ring gear in mesh with one of said pair of idler gears to constitute differential connections and fluid-pressure appliances each including a valve structure and adapted in response to the rapid rotation of said shafts to cut off fluid circulation through said valve structure, thereby resisting functioning of said differential connections.

8. A dual wheel comprising the combination of a hub, a differential appliance including a circumferentially arranged set of revoluble pinions on said hub, dual wheels, gears rotatable with said dual wheels respectively and each in mesh with said pinions, and fluid pressure devices comprising elements cooperating with said pinions and comprising pairs of valves of which one of each pair is adapted to be closed during the functionating of said devices whereby to resist rotation of said pinions.

9. In a differential dual wheel, the combination of a hub, a plurality of axially extending shafts rotatably and revolubly mounted on said hub with their axes in a concentric cylindrical plane, a pair of gear elements carried by each of said shafts, a pair of wheels mounted on said hub near the planes of the wheel which enclose said shafts and each carrying a gear in mesh with corresponding ones of said sets of circularly disposed gear elements and hydraulic means comprising pump chambers about said shafts respectively, said chambers each having a valve controlled inlet and a valve controlled outlet, said outlets, depending upon the direction of rotation of said shafts, being adapted to become closed whereby to resist the differential action and to cause the paired wheel units to rotate in unison.

10. In a differential dual wheel, the combination of a wheel couple, differential gearing in operative connection therebetween and including an idler pinion shaft, and hydraulic means comprising a pump housing, pressure-actuated valves, and a pump in the latter, said pump being connected to rotate in unison with said pinion shaft and adapted to seat one of said valves to close an outlet from said housing, whereby said means may resist excessive differential action.

11. In a differential dual wheel, the combination of a wheel couple, a differential gear set operatively connecting said wheel couple and including an idler pinion shaft, and a hydraulic appliance for automatically resisting the differential operation of said gearing and comprising; a pump housing, vanes secured to one end of said pinion shaft and turnable in said housing and pressure-operated valves responsive to the rotation of said vanes, one of said valves closing under sufficient pressure exerted in said housing whereupon the specified function of said appliance becomes exercised.

12. In combination, a differential dual wheel comprising two wheels in adjacent relationship at one end of an axle, differential gear sets connecting said pair of wheels and a plurality of circumferentially arranged fluid pressure appliances each including; a pump housing into which an element of one of said gear sets projects, a pump structure within said housing and connected with said element and ball valves controlling the flow of fluid through said housing and automatically operative upon occurrence of a predeterminable differential action between the wheels to resist the functionating of said gear sets.

WARREN C. LICHTY.